United States Patent Office 2,819,489
Patented Jan. 14, 1958

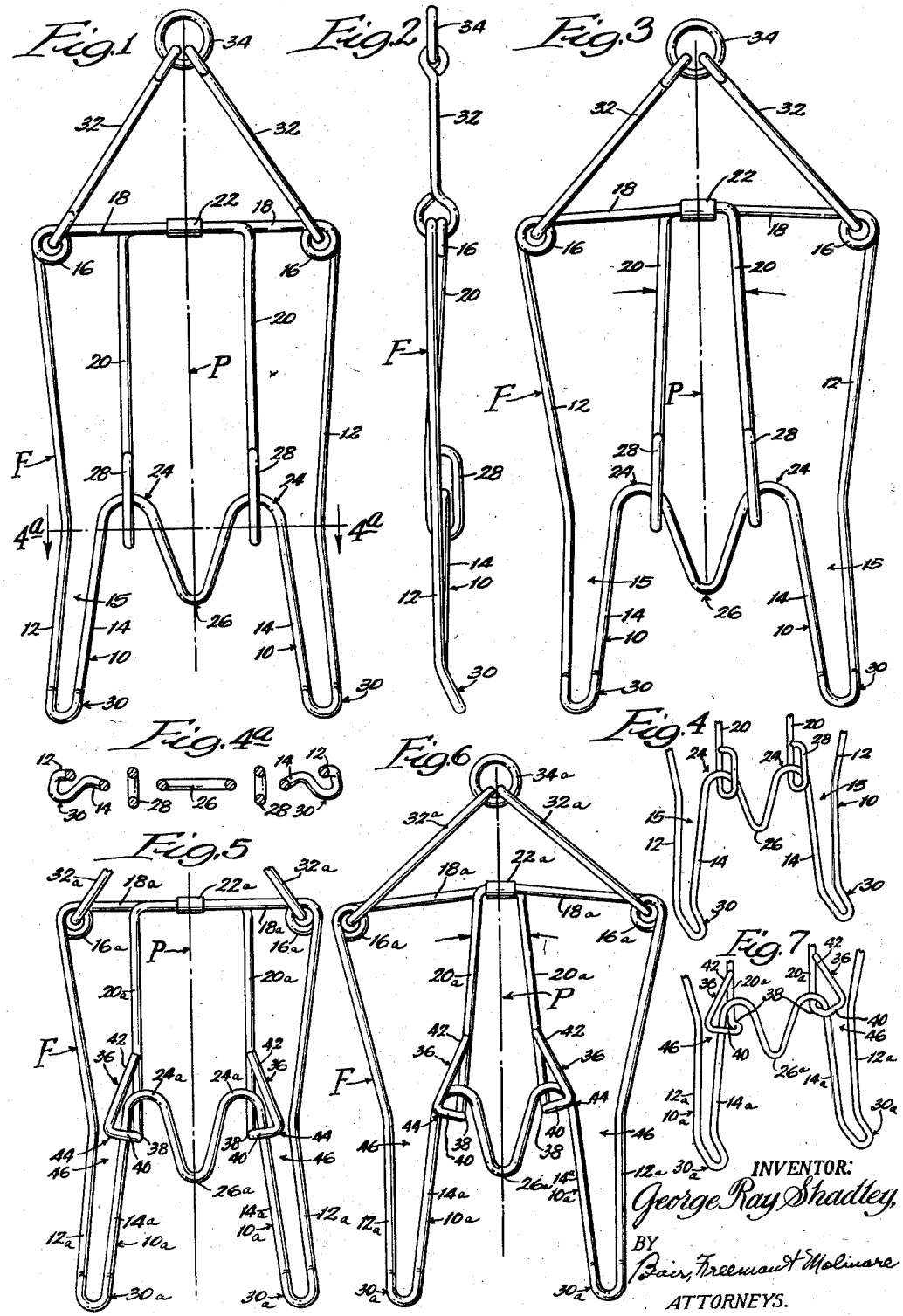

2,819,489

ANIMAL SHACKLE

George Ray Shadley, Ottumwa, Iowa

Application March 1, 1954, Serial No. 413,227

11 Claims. (Cl. 17—44.1)

This invention relates to an animal shackle, for conveniently supporting fowls, rabbits, etc. in killing, scalding, picking or other processing operations. More particularly, the present invention is directed to a shackle formed of wire and having means for distorting portions thereof so as to afford ease of entrance and removal of the legs of a fowl from said shackle.

While wire shackles have been known previously, the body portions of said wire shackles are usually formed by welding together a plurality of units or parts formed from separate pieces of wire.

One of the objects of this invention is to provide an animal shackle wherein the entire body portion of the shackle is formed from a single length of wire.

Previous wire shackles, because of the fact that they were formed of wire, were provided with reinforcing members of wire, or the like, to make them more rigid. Because of such rigidity, such shackles have a limitation as to the range of fowl sizes with which they could be used.

Another object of this invention is to provide an animal shackle formed entirely of wire, wherein the above set forth deficiency is obviated and wherein the shackle is sufficiently resilient to accommodate a relatively large range of sizes of legs of poultry, rabbits, etc.

Furthermore, previous wire fowl shackles were not provided with any accessory means for assisting in the discharge of the legs of the animal from the shackle. Once the animals' legs were wedged into the converging portions of the leg-holding elements, and in view of the relative rigidity with which said previous wire shackles were formed, it was often found that much force was required to effect the release of the animals from wedging engagement with the leg-holding elements.

Thus, a further object of this invention is to obviate the problem associated with the release of the animals' legs from a wire shackle by providing means for distorting the leg-holding elements of the wire shackle so as to facilitate the insertion and removal of the legs from the leg-holding elements of the shackle.

Still another object of this invention is to provide a wire shackle having means for distorting the leg-holding elements thereof, and wherein said means for distorting the leg-holding elements are themselves formed from the same single wire element which forms the body of the shackle.

Still another object of this invention is to provide a wire shackle wherein portions of the leg-holding elements are offset with respect to each other, and which wire shackle has sufficient resiliency to permit relative distortion between said offset portions of the leg-holding elements, thus providing an additional means for easing the removal of the legs of the animal from the shackle.

Further objects and advantages of this invention will be apparent from the following description, taken in connection with the accompanying drawing, in which:

Figure 1 is a front, elevation view of a shackle illustrating one form of the novel wire shackle, and showing the shackle in its normal, unstressed condition;

Figure 2 is a side elevation view of the shackle, looking from the left of Figure 1;

Figure 3 illustrates the shackle shown in Figure 1, and shows the shackle in a distorted position, caused by movement of the hand-engaging members toward each other;

Figure 4 is a fragmentary perspective view, on a reduced scale, of the lower portion of the shackle member, shown in Figures 1 to 3;

Figure 4a is a cross-sectional view, taken at line 4a—4a on Figure 1;

Figure 5 is a view similar to Figure 1 of a novel modified form of shackle;

Figure 6 is similar to Figure 3, showing the form of shackle of Figure 5 in a distorted condition;

Figure 7 is similar to Figure 4, and shows a perspective view of the lower portion of the shackle shown in Figures 5 and 6.

Referring to Figure 1 of the drawing, there is shown a shackle for receiving the legs of an animal therein. The shackle includes a frame F formed from a single, continuous length of resilient wire, and which frame is symmetrical about a central vertical plane indicated by the dot-dash line P shown in Figure 1. The frame F is shaped to define a pair of uprightly disposed leg-holding hairpin shaped elements, generally indicated at 10. Each leg-holding hairpin shaped element 10 includes an outer portion 12 and an inner portion 14 between which is defined a leg-receiving passageway 15. The outer portion 12 extends to a point above and laterally outward with respect to the uppermost extent of said inner hairpin portion 14, and is then bent to define a full loop, or ring, 16, and then continues laterally inwardly to define a top member 18 which extends in the direction toward the other leg-holding hairpin. The top member 18 extends to a point beyond said vertical plane P and is then bent to extend downwardly to form a hand-engaging portion 20.

The pair of top members 18, of the frame F, pass adjacent each other and have overlapping, longitudinal portions. A band, or sleeve, 22, is wrapped around the overlapping adjacent portions of the top members 18 and thereby prevents lateral separation of said top members 18, while affording relative longitudinal movement of the top members 18 therebetween.

The inner hairpin portions 14 are connected together by a portion of the resilient wire, which is shaped to define a pair of inverted U-shaped sections, generally indicated at 24, and which U-shaped sections unite, or merge, to define an uprightly disposed V-portion 26, centrally of the shackle. The V-portion 26 is adapted for the reception therein of the neck of the animal.

The lower end of each hand-engaging portion 20 has a loop 28 formed therein which slidably surrounds the bight of the inverted U-shaped section 24, as shown. The loops 28 are formed from the terminal ends of the wire and are adapted, when the hand-engaging portions 20 are pressed together, to engage the legs of the V-portion 26, as best seen in Figure 3, to limit movement of said loops 28 in the direction toward each other. The band or sleeve 22 operates to limit the movement of the upper ends of the hand-engaging portions 20 toward each other, as seen in Figure 3. The dimensioning of the sleeve or band 22, the dimensioning of the loops 28 and the V-portion 26, is such that the upper ends of the hand-engaging portions 20 may be moved closer to each other than the lower ends of said portions, as illustrated in Figure 3.

The lowermost portion 30, of each hairpin shaped element 10, is bent at a slight angle from the main plane of the major portion of the hairpin shaped element 10, as can best be seen in Figures 2 and 4. The purpose of this feature is to permit the animal to be properly suspended in a substantially vertical plane, with its legs in a substantially vertical position.

The frame F is provided with means for support from a conveyor or the like by the provision of a pair of links 32 which are pivotally connected to the frame F through the medium of loops 16, which are joined together at their upper ends by a single link, or ring, 34.

As best seen in Figures 2 and 4a, the portions of the shackle including the inner hairpin portions 14, the inverted U-shaped sections 24, and the uprightly disposed V-portion 26, lie in an upright plane disposed at a small acute angle relative to the vertical plane in which the outer hairpin portions 12 lie. This offset arrangement permits ready distortion of the outer hairpin portion 12 relative to the inner hairpin portion 14, in a manner such as to increase the angle between said offset planes in which said portions lie, and serves to let the legs of the fowl come together, at the knees, as the fowl is being lifted out of the hairpin elements 10, and thereby reducing possible binding action on the legs, such as occurs in rigid type of shackles. This distortion of the leg-holding hairpin shaped elements permits the leg of an animal to be more easily inserted into and removed from the leg-holding hairpin element 10.

In the modified form of my invention shown in Figures 5, 6 and 7, all parts, corresponding to like parts of the construction shown in Figures 1 to 4, of the drawings, are accorded similar reference numerals, together with the letter "a." In the construction shown in Figures 5, 6 and 7 the loop at the lower ends of the hand-engaging portions, designated at 36, is shaped differently than loops in the construction seen in Figures 1 to 4. In Figures 5, 6 and 7, the lower end of the hand-engaging portion 20a defines a transverse leg 38, which passes under the bight of the inverted U-shaped section 24a, and then continues into a laterally extending leg 40, which passes across the inner hairpin portion 14a, adjacent the upper end thereof. A terminal end 42 of the wire is then bent upwardly and at an angle extending back toward the hand-engaging portion 20a, thus completing a loop and at the same time defining a stop member generally indicated at 44 which, when the hand-engaging portions 20a are in normal position, extends across the leg-receiving passageway 46, defined between an inner hairpin portion 14a and an outer hairpin portion 12a. This stop member 44 serves to block the exit of the leg-receiving passageway 46 so as to prevent inadvertent disengagement of an animal's leg out of said leg-holding hairpin.

When the hand-engaging portions 20a are squeezed toward each other so that they take the position shown in Figure 6, the stop members 44 are withdrawn from blocking position across the leg-receiving passageways 46, and thus permits removal of the animal's legs from the leg-holding hairpins 10a.

In operation, the handle portions 20 are squeezed toward each other from the position in Figure 1 to the position in Figure 3, or the handle portions 20a are squeezed toward each other from the position in Figure 5 to the position in Figure 6, thereby causing the outer hairpin portions 12 and 12a respectively to be moved apart relative to each other and relative to their associated inner hairpin portions 14, and 14a respectively, as shown. This serves to enlarge the upper portions of the leg-receiving passageways 15 and 46 and thus permits greater ease of insertion and removal of the leg of the animal from wedging engagement with the leg-holding hairpin shaped element 10 and 10a, by relieving the clamping pressure which is applied to the leg by the inner and outer hairpin portions.

The inherent resiliency of the entire frame F and Fa permits the hairpin shaped, leg-receiving elements 10 and 10a to accommodate a greater range of leg sizes than could be attained with rigid type shackles where the portions defining the leg-grasping elements are more rigidly mounted relative to each other. The resiliency also permits greater ease in loading and unloading the shackle frame and, furthermore, the resiliency of the frame provides for maintaining a tighter grip on the animal's legs when pull is applied to the body of the animal, such as happens when a fowl is passing through a picking machine, or through some other processing operation.

In loading the shackle disclosed herein, the frame is distorted to the positions shown in Figures 3 and 6, just like the manner the frame is distorted for the purpose of removing the legs of the fowl from the shackle. With the frame distorted to the position shown in Figure 3 or Figure 6, and with the legs of the animal inserted in the passageways 15 or 46 defined by the inner and outer hairpin portions, after the hand portions 20 or 20a are released, the resiliency of the frame serves to clamp the legs firmly between the hairpin portions 12 and 14, and 12a and 14a respectively. In unloading the shackle, the same procedure is again followed except that this time the legs are lifted out of the passageways 15 and 46, instead of being inserted therein.

Although I have herein shown and described a preferred embodiment of my invention, manifestly it is capable of modification and rearrangement of parts without departing from the spirit and scope thereof. I do not, therefore, wish to be understood as limiting this invention to the precise embodiment herein disclosed, except as I may be so limited by the appended claims.

I claim:

1. A shackle for an animal comprising a frame formed from a single continuous length of resilient wire comprising a pair of uprightly disposed, leg-holding hairpin shaped elements symmetrically disposed about a central vertical plane and each having outer and inner hairpin portions, each outer hairpin portion extending to a point above the uppermost extent of said inner hairpin portion and being connected to a top member extending laterally in the direction toward the other leg-holding hairpin and extending to a point beyond said vertical plane, and continuing into a depending hand-engaging portion, said pair of hand-engaging portions adapted to be grasped simultaneously and squeezed toward each other, thereby causing the outer hairpin portions to be moved apart relative to each other and relative to their associated inner hairpin portions.

2. A shackle for an animal comprising a frame formed from a single continuous length of resilient wire comprising a pair of uprightly disposed, leg-holding hairpin shaped elements symmetrically disposed about a central vertical plane and each having outer and inner hairpin portions, each outer hairpin portion extending to a point above the uppermost extent of said inner hairpin portion and connected to a top member extending laterally in the direction toward the other leg-holding hairpin and extending to a point beyond said vertical plane and continuing into a depending hand-engaging portion, said pair of hand-engaging portions adapted to be grasped simultaneously and squeezed toward each other, thereby causing the outer hairpin portions to be moved apart relative to each other and relative to their associated inner hairpin portions, and means operatively associated with the lower ends of said hand-engaging portions for limiting the range of movement thereof relative to each other.

3. A shackle for an animal comprising a frame formed from a single continuous length of resilient wire comprising a pair of uprightly disposed, leg-holding hairpin shaped elements symmetrically disposed about a vertical plane and each having outer and inner hairpin portions, each outer hairpin portion extending to a point above the uppermost extent of said inner hairpin portion and connected to a top member extending laterally in the direction toward the other leg-holding hairpin and extending to a point beyond said vertical plane and continuing into a depending hand-engaging portion, said pair of hand-engaging portions adapted to be grasped simultaneously and squeezed toward each other, thereby causing the outer hairpin portions to be moved apart relative to each other and relative to their associated inner hairpin portions, said top members passing adjacent each other, and means securing the top members together in a manner to permit relative longitudinal movement therebetween.

4. A shackle for an animal comprising a frame formed from a single continuous length of resilient wire comprising a pair of uprightly disposed, leg-holding hairpin shaped elements symmetrically disposed about a central vertical plane and each having outer and inner hairpin portions, each outer hairpin portion extending to a point above the uppermost extent of said inner hairpin portion and connected to a top member extending laterally in the direction toward the other leg-holding hairpin and extending to a point beyond said vertical plane and continuing into a depending hand-engaging portion, said pair of hand-engaging portions adapted to be grasped simultaneously and squeezed toward each other, thereby causing the outer hairpin portions to be moved apart relative to each other and relative to their associated inner hairpin portions, said top members passing adjacent each other, a sleeve surrounding said adjacent portions of said top members for preventing lateral spreading between said top members and for permitting longitudinal movement therebetween, said sleeve cooperating with said hand-engaging portions to limit movement of the upper ends of said hand-engaging portions toward each other, and means operatively associated with the lower ends of said hand-engaging portions for limiting the range of movement thereof relative to each other, the upper ends of said hand-engaging portions being movable closer to each other than the lower ends thereof.

5. A shackle for an animal comprising a frame formed from a single continuous length of resilient wire comprising a pair of uprightly disposed, leg-holding hairpin shaped elements symmetrically disposed about a central vertical plane and each having outer and inner hairpin portions, each outer hairpin portion extending to a point above the uppermost extent of said inner hairpin portion and connected to a top member extending laterally in the direction toward the other leg-holding hairpin and extending to a point beyond said vertical plane and continuing into a depending hand-engaging portion, said pair of hand-engaging portions adapted to be grasped simultaneously and squeezed toward each other, thereby causing the outer hairpin portions to be moved apart relative to each other and relative to their associated inner hairpin portions, and said resilient wire having loops formed at the junctions between each top member and its associated outer hairpin member.

6. A shackle for an animal comprising a frame formed from a single continuous length of resilient wire comprising a pair of uprightly disposed, leg-holding hairpin shaped elements symmetrically disposed about a central vertical plane and each having outer and inner hairpin portions, each outer hairpin portion extending to a point above the uppermost extent of said inner hairpin portion and connected to a top member extending laterally in the direction toward the other leg-holding hairpin and extending to a point beyond said vertical plane and continuing into a depending hand-engaging portion, said pair of hand-engaging portions adapted to be grasped simultaneously and squeezed toward each other, thereby causing the outer hairpin portions to be moved apart relative to each other and relative to their associated inner hairpin portions, said resilient wire having loops formed at the junctions between each top member and its associated outer hairpin member, and a pair of links each connected at one end to a single link and at their other end to one of said loops.

7. A shackle for an animal comprising a frame formed from a single continuous length of resilient wire comprising a pair of uprightly disposed, leg-holding hairpin shaped elements symmetrically disposed about a central vertical plane and each having outer and inner hairpin portions, each outer hairpin portion extending to a point above the uppermost extent of said inner hairpin portion and connected to a top member extending laterally in the direction toward the other leg-holding hairpin and extending to a point beyond said vertical plane and continuing into a depending hand-engaging portion, said pair of hand-engaging portions adapted to be grasped simultaneously and squeezed toward each other, thereby causing the outer hairpin portions to be moved apart relative to each other and relative to their associated inner hairpin portions, and the lowermost portion of each hairpin shaped element extending at a slight angle from the plane extending through the major portion of said hairpin shaped element.

8. A shackle for an animal comprising a frame formed from a single continuous length of resilient wire comprising a pair of uprightly disposed, leg-holding hairpin shaped elements symmetrically disposed about a central vertical plane and each having outer and inner hairpin portions, each outer hairpin portion extending to a point above the uppermost extent of said inner hairpin portion and connected to a top member extending laterally in the direction toward the other leg-holding hairpin and extending to a point beyond said vertical plane and continuing into a depending hand-engaging portion, said pair of hand-engaging portions adapted to be grasped simultaneously and squeezed toward each other, thereby causing the outer hairpin portions to be moved apart relative to each other and relative to their associated inner hairpin portions, said top members passing adjacent each other, a sleeve surrounding said adjacent portions of said top members for preventing lateral spreading between said top members and for permitting longitudinal movement therebetween, said resilient wire forming loops at the junctions between each top member and its associated outer hairpin member, the inner hairpin portions being connected together by a shaped portion of said resilient wire defining a pair of inverted U-shaped sections which unite to define an uprightly disposed, V-shaped portion, centrally of the shackle, adapted for the reception therein of the neck of an animal, the lower end of each hand-engaging portion forming a loop therein which slidably surrounds the bight of one of said inverted, U-shaped sections, said loops adapted to engage the legs of said V-shaped portion to limit movement of said loops toward each other, and each loop portion defining a stop member which, when said hand-engaging portion is in its normal position, extends into the leg-receiving passageway defined between an inner and outer hairpin portion, thereby forming a blocking member for preventing inadvertent dislodgment of an animal's leg out of said leg-holding hairpin, and the movement of said hand-engaging portions toward each other being operative to withdraw said stop members from said blocking positions, thereby permitting removal of an animal's leg from said leg-holding hairpin.

9. A shackle for an animal comprising a frame formed from a single continuous length of resilient wire comprising a pair of uprightly disposed, leg-holding hairpin shaped elements symmetrically disposed about a central vertical plane and each having outer and inner hairpin portions, each outer hairpin portion extending to a point above the uppermost extent of said inner hairpin portion and connected to a top member extending laterally in the direction toward the other leg-holding hairpin and extending to a point beyond said vertical plane and continuing into a depending hand-engaging portion, said pair of hand-engaging portions adapted to be grasped simultaneously and squeezed toward each other, thereby causing the outer hairpin portions to be moved apart relative to each other and relative to their associated inner hairpin portions, said top members passing adjacent each other, a sleeve surrounding said adjacent portions of said top members for preventing lateral spreading between said top members and permitting longitudinal movement therebetween, said resilient wire forming loops at the junctions between each top member and its associated outer hairpin member, the inner hairpin portions being connected together by a shaped portion of said resilient wire defining a pair of inverted U-shaped sections which unite to define an uprightly disposed V-shaped portion, centrally of the shackle, adapted for the reception therein of the neck of an animal, the lower end of each hand-engaging portion forming a loop therein which slidably surrounds the bight of one of said inverted U-shaped sections, said loops adapted to engage the legs of said V-shaped portion to limit movement of said loops toward each other, each loop portion defining a stop member which, when said hand-engaging portion is in its normal position, extends into a leg-receiving passageway defined between an inner and outer hairpin portion, thereby forming a blocking member for preventing inadvertent dislodgment of an animal's leg out of said leg-holding hairpin, the movement of said hand-engaging portions toward each other being operative to withdraw said stop members from said blocking positions, thereby permitting removal of an animal's leg from said leg-holding hairpin, and the portions of said shackle including said inner hairpin portions, said inverted U-shaped sections, and uprightly disposed V-shaped portion, lying in a plane disposed at a small acute angle relative to the plane extending through the major portion of said outer hairpin portions.

10. An animal shackle having a pair of spaced apart, upwardly open, resilient wire leg holders, adapted to urge the lower ends thereof into firm gripping relation to the legs of an animal by the weight of the animal when suspended by the shackle, each leg holder having a laterally movable portion, and hand grips connected respectively to each of said movable portions for causing opening of said leg holders.

11. An animal shackle having a pair of spaced apart, upwardly open, wire leg holders, each holder having a movable wire portion, and a pair of hand grips connected respectively to said movable portions of the holders and adapted, when said grips are moved relatively to each other, for opening said holders and simultaneously building up energy in said portions of the holders for effecting closure of said holders when pressure on said grips is released.

References Cited in the file of this patent

UNITED STATES PATENTS

| | | |
|---|---|---|
| 1,742,569 | Barker et al. | Jan. 7, 1930 |
| 2,035,948 | De Vout | Mar. 31, 1936 |
| 2,125,787 | Istre | Aug. 2, 1938 |
| 2,358,373 | Allred | Sept. 19, 1944 |
| 2,405,638 | Bilek | Aug. 13, 1946 |
| 2,613,390 | Wayne | Oct. 14, 1952 |
| 2,632,201 | Van Dolah | Mar. 24, 1953 |